(12) United States Patent
Westphal

(10) Patent No.: US 7,162,249 B2
(45) Date of Patent: Jan. 9, 2007

(54) SCHEDULING DATA TRANSMISSION IN A WIRELESS COMMUNICATIONS NETWORK

(75) Inventor: Cedric Westphal, San Francisco, CA (US)

(73) Assignee: Nokia Corporation, Espoo (FI)

( * ) Notice: Subject to any disclaimer, the term of this patent is extended or adjusted under 35 U.S.C. 154(b) by 29 days.

(21) Appl. No.: 10/943,021

(22) Filed: Sep. 17, 2004

(65) Prior Publication Data

US 2006/0002364 A1 Jan. 5, 2006

(30) Foreign Application Priority Data

Jun. 30, 2004 (GB) ................................. 0414663.5

(51) Int. Cl.
*H04Q 7/20* (2006.01)
(52) U.S. Cl. ..................... 455/450; 455/451; 455/452.1
(58) Field of Classification Search ................ 455/450, 455/451, 452.1, 452.2, 453, 522
See application file for complete search history.

(56) References Cited

U.S. PATENT DOCUMENTS

| | | | |
|---|---|---|---|
| 2002/0183084 A1* | 12/2002 | Wu et al. | 455/509 |
| 2003/0123410 A1* | 7/2003 | Youm | 370/335 |
| 2004/0038697 A1* | 2/2004 | Attar et al. | 455/522 |
| 2004/0228298 A1* | 11/2004 | Lee | 370/328 |
| 2004/0233867 A1* | 11/2004 | Wheatley et al. | 370/328 |
| 2005/0003796 A1* | 1/2005 | Kashiwase | 455/403 |
| 2005/0260998 A1* | 11/2005 | Casaccia et al. | 455/452.2 |

* cited by examiner

*Primary Examiner*—Erika A. Gary
*Assistant Examiner*—Huy D Nguyen
(74) *Attorney, Agent, or Firm*—Squire, Sanders & Dempsey LLP

(57) ABSTRACT

A method of scheduling data transmission between a plurality of nodes in a wireless communication network, the method comprising: defining a plurality of rate bins each defined by a quantile index; receiving transmission requests from said nodes, said requests each defining a data rate; assigning a value to each request based on the rate defined in the request and the quantile indices of the rate bins; and effecting a scheduling decision based on the value assigned to the request.

16 Claims, 4 Drawing Sheets

SCHEDULING DATA TRANSMISSION IN A WIRELESS COMMUNICATIONS NETWORK

FIELD OF THE INVENTION

The present invention relates to scheduling data transmission in a wireless communications network.

BACKGROUND OF THE INVENTION

In addition to providing a media for calls (that is exchange of voice data), wireless communications networks are increasingly used to provide a platform for the transmission of data, for example to provide information, video and other packet-based services to users of the network. In a wireless communications network, a base station (or other access point) can support one or more users whose link conditions vary. Moreover, users can come and go as they move through the network. Currently, data is transmitted from a base station to one or more user according to predefined data rates. The data rate and number of time slots which are used to transmit packet-based services is determined by channel conditions. When channel conditions are unfavourable, a lower data rate with more time slots is used to transmit data. A mobile user is constantly monitoring RF signal strength of its link with the base station or other access point. It determines the signal to noise ratio (SNR) and uses that to determine what data rate the link conditions will support. Thus, a mobile user will constantly update the base station with data rate requests based on its signal to noise ratio and expected future channel conditions. In turn, the base station transmits data to one mobile user at any given time (measured in time slots, e.g. 1.67 ms) and transmits that data with full power and at a data rate requested by the mobile user. The base station transmits over the radio link with that particular user in that particular time slot, the link constituting a physical signalling channel defined for example by frequency, coding or a combination of the two.

With multiple users therefore it is necessary for the base station to determine for any particular time slot to which mobile station it will transmit data. A scheduler intelligently allocates time slots to optimise throughput by taking advantage of the ups and downs in channel conditions for the mobile users. In the drive towards higher bandwidth, scheduling algorithms that take into account link quality are being standardised and deployed. A Proportional Fairness (PF) algorithm is used in CDMA (code division multiplexed access) HDR (high data rate) networks.

PF is designed to schedule the node whose link quality is the best when normalised with its average throughput. However, the algorithm does not achieve this goal when the channels to different mobile users are heterogeneous, that is when the rate distributions of the channel conditions for different mobile users follow different types of distributions or when the device is rate limited.

Several improvements have been made to compensate for these shortcomings. A score-based (SB) scheduler has been proposed. However, this scheduler is either sensitive to correlation in the packet rates, or requires to store a large amount of data at the scheduler (namely, an extended history of the rate requests for each node).

PF works as follows: for channels (or mobile nodes) $j=1, \ldots, N$ requesting rate $r_j$, PF chooses nodes n such that:

$$n = arg_{j \in \{1,\ldots,N\}}^{max} \left( \frac{r_j}{R_j} \right) \qquad \text{Equation 1}$$

$$R_j(t+1) = (1-\alpha)R_j(t) + \alpha 1_{(n=j)} r_j \qquad \text{Equation 2}$$

and $0 < \alpha < 1$

The SB considers its scheduling decision by ranking the rate $r_j(t)$ against the W previous values $r_j(t-1), \ldots, r_j(t-W)$, thus yielding an ordering score $w_j$ in $\{1, \ldots,\}$. It schedules the channel for which:

$$n = arg_j^{max} w_j \text{ with the appropriate tie breaker.} \qquad \text{Equation 3}$$

FIG. 1 illustrates the use of a proportional fairness algorithm according to a simple example. Take two nodes sharing one channel. One node, say node 1, can achieve a rate of 1 with probability 0.99 or 100 otherwise. The other node, node 2, always achieves a rate of 2. The numbers represent normalised rates for comparison purposes. In reality, rates are measured in Kbps or Mbps. This is illustrated in FIG. 1, which plots $R_1$ and $R_2$ according to equation 2, with $\alpha$=0.01.

PF will roughly work in the following manner. When the rate of node 1 is 100, then it is chosen. Otherwise node 2 is chosen, as long as the scheduler remembers that node 1 has achieved this rate of 100 (how long the scheduler remembers depends on the parameter of the moving average used to estimate the rate of node 1. In FIG. 1, $\alpha$=0.01). Of course, this prevents node 1 from transmitting most of the time. Because the decision is based on the average, the achieved rates are equal. However, while most of the time the channel for node 1 is good enough for transmission, it is node 2 that is chosen. Further, while node 1 can achieve a rate close to 2, it only achieves a rate close to 1 in this situation, while node 2 does achieve its mean rate 2.

For a given channel, what matters for the decision is whether or not this channel is performing beyond its expectations. Proportional Fairness assesses the performance by dividing the current achievable rate by the mean throughput. However, comparing to the achieved throughput is not reliable in this situation.

The SB scheduler has a similar problem. Consider a different example with two nodes as well. Node 2 can achieve the rate sequence of 1 twenty times in a row then 10 five times in a row. Node 2 can achieve a constant rate 2. If the depth (the number of previous rate requests retrieved in the memory) of the scheduler is 3, then node 1 and 2 roughly get chosen with the same probability except for the first two times node 1 can achieve the rate 10. The mean rate achieved in this case is depicted in FIG. 2. The correlation reduces the effect of the scheduling. We see that node 2 achieves rate 1, node 1 achieves rate close to 1.4, which is about the performance of a round robin system.

From these two simple examples, we can see that the scheduling algorithms performed unevenly with respect to the objective they set to achieve.

SUMMARY OF THE INVENTION

It is an aim of the present invention to provide an improved method of scheduling data transmission in a wireless communications network.

According to one aspect of the invention there is provided a method of scheduling data transmission between a plurality of nodes in a wireless communication network, the method comprising: defining a plurality of rate bins each defined by a quantile index; receiving transmission requests from said nodes, said requests each defining a data rate; assigning a value to each request based on the rate defined in the request and the quantile indices of the rate bins; and effecting a scheduling decision based on the value assigned to the request.

Another aspect of the invention provides a network entity adapted for scheduling data transmission between a plurality of nodes in a wireless communication network, the network entity comprising: means for defining a plurality of rate bins each defined by a quantile index; means for receiving transmission requests from said nodes, said requests each defining a data rate; means for assigning a value to each request based on the rate defined in the request and the quantile indices of the rate bins; and effecting a scheduling decision based on the value assigned to the request.

In the described embodiment, the method includes the step of transmitting data in successive time slots, wherein the scheduling decision selects which node to transmit data to in each time slot.

The inventors realised that one of the problems with the above-described scheduling algorithms was that the reference framework was modified by the scheduler with new rate information received in each time slot. The method and system described herein allows different channels to be ranked in terms of their relative quality. That is, the scheduling algorithm operates in two phases: the first phase is to establish a reference framework, and the second phase is to grade the channel based on the reference framework.

For a better understanding of the present invention and to show how the same may be carried into effect, reference will now be made by way of example to the accompanying drawings.

DESCRIPTION OF THE PREFERRED EMBODIMENT

Figure 1:
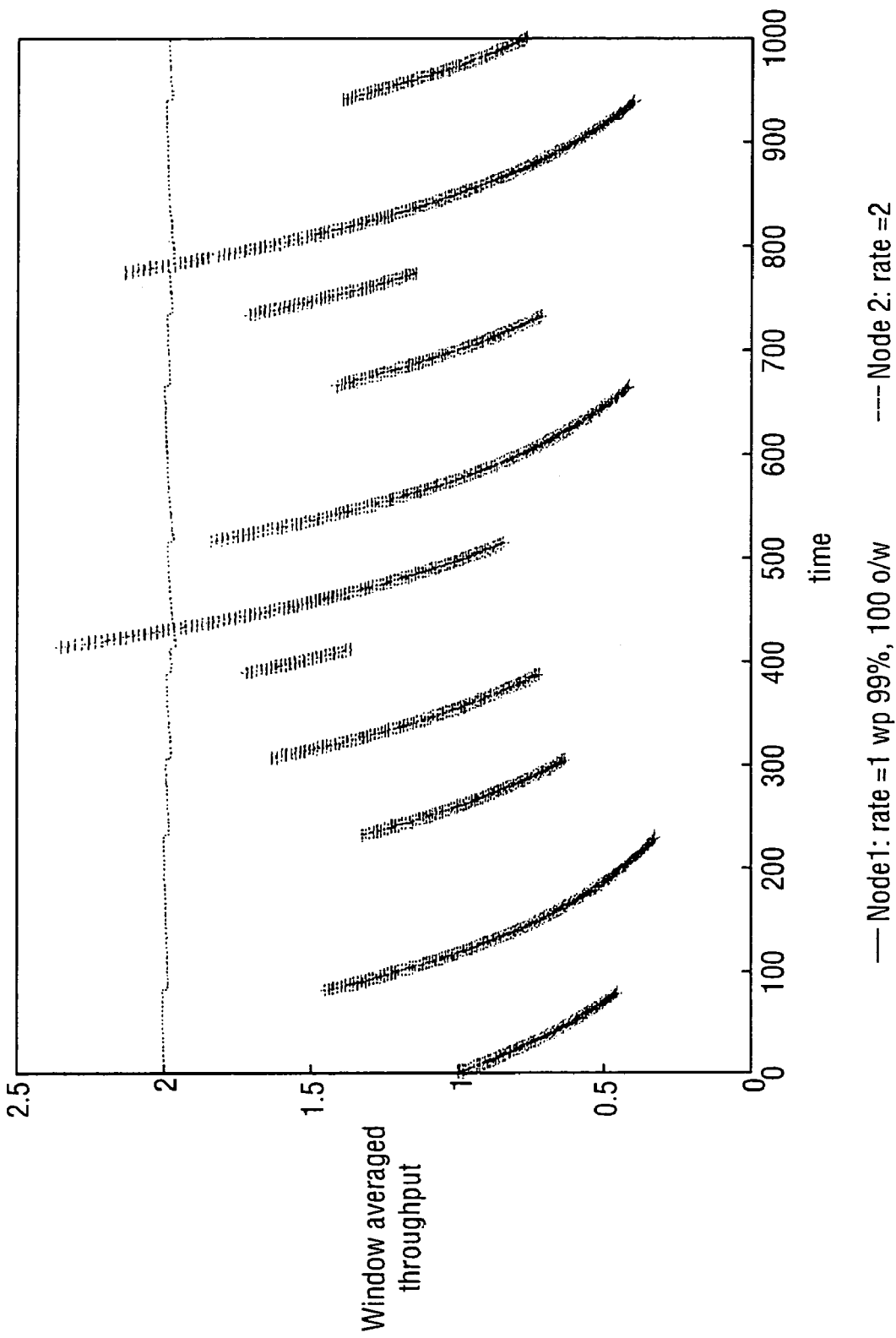
FIG. 1 is an example of a Proportional Fairness algorithm.
Figure 2:
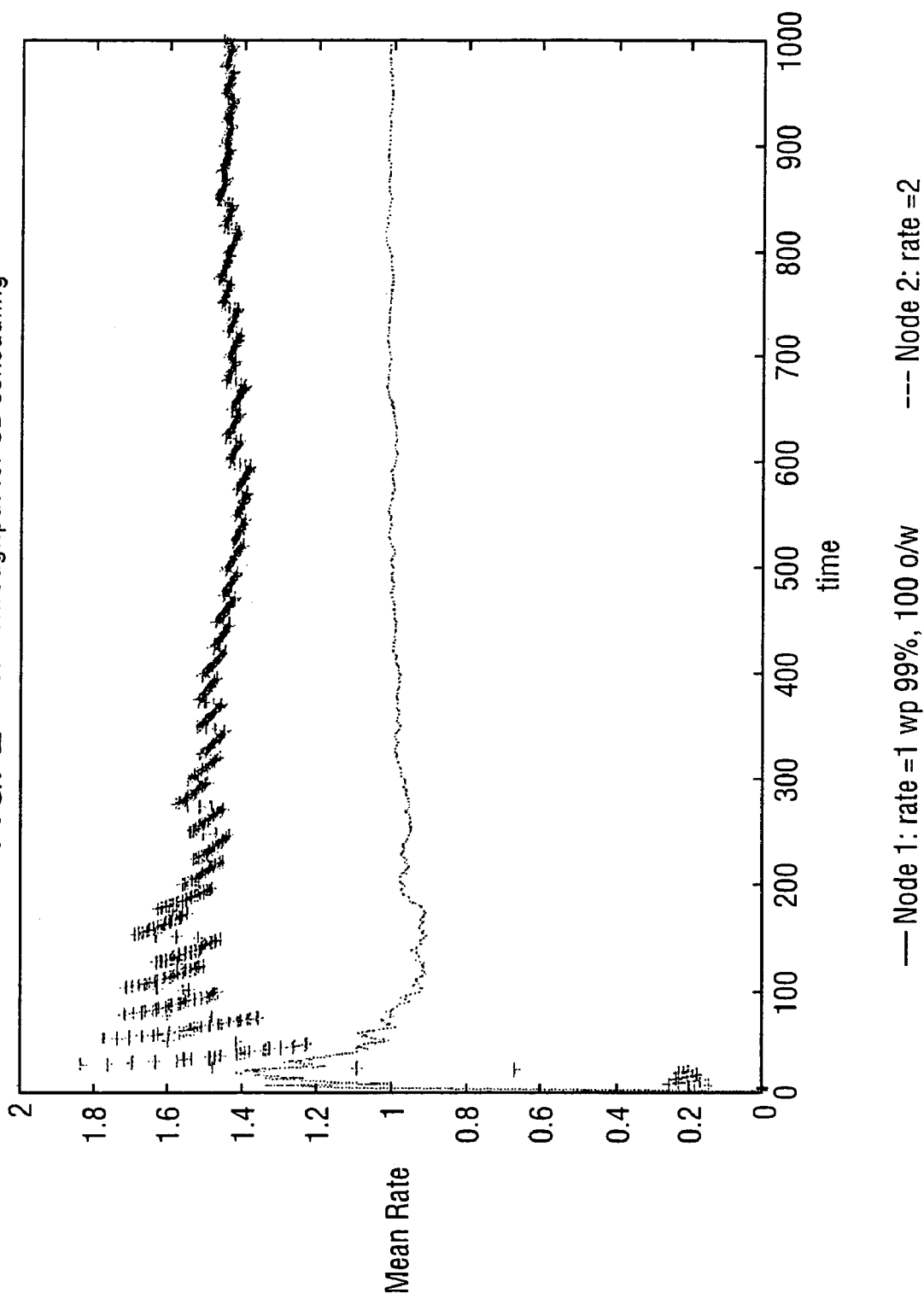
FIG. 2 illustrates an example of a score-based scheduling algorithm.
Figure 3:
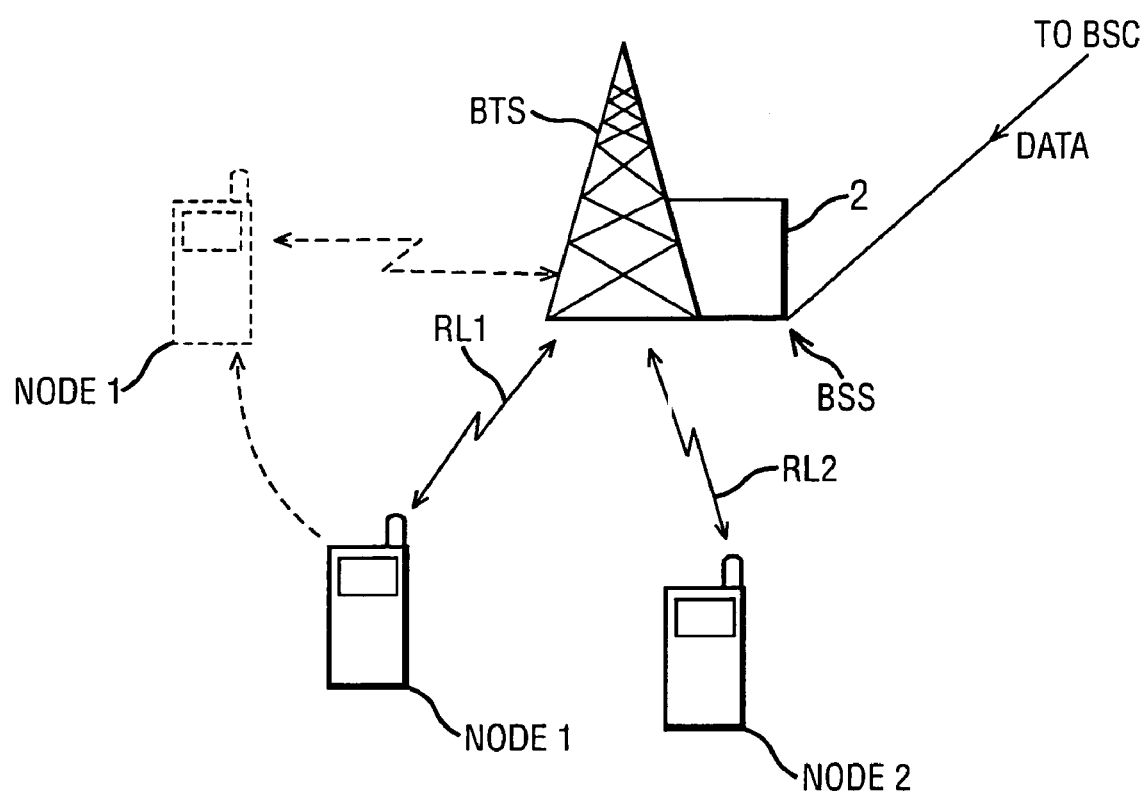
FIG. 3 is a schematic block diagram of components of a network.

FIG. 3 illustrates the relevant entities in a wireless communications network. FIG. 3 illustrates a base station BTS which forms part of a base station sub-system BSS which includes, amongst other things, a scheduler 2. The base station BTS receives data, in particular for packet-based services, from a base station controller BSC. The base station BTS is in communication with a number of users, two of which are shown in FIG. 3 labelled Node 1, Node 2. Each user is in communication with the base station BTS via a respective radio link RL1, RL2. RF conditions on the radio links vary as the users move relative to the base station, or come and go from the cells governed by other base stations. Node 1 is also shown in dotted lines which represents a new position of the user, with a new radio link to the base station BTS. Each radio link constitutes a physical signalling channel between the base station and the user. The channel can be defined by frequency or coding or a combination of the two, depending on the protocol which is being used in the network. When the base station transmits data to any particular user, it uses the code and/or frequency parameters which define the particular channel constituting the link between the base station and that user.

It will be appreciated that users can be using any form of equipment, for example mobile phones, mobile computers or any other mobile devices. Also, the system described herein can be used where some of the nodes are fixed in the network. RF conditions around a fixed node can still alter due to the movement of other users in the network.

The base station BTS is responsible for transmitting data to the users for whom it is responsible under the control of the scheduler 2. The base station BTS transmits data in successive time slots TS, and in each time slot is in communication with only one user. The scheduler determines to which user the transmission should be made for any particular time slot, based on the channel conditions of the radio links to the users and the consequential rates requested by the users. As discussed earlier, a user requests a transmission data rate depending on the RF conditions of its radio link. The data rate represents the amount of data delivered (at full power) in a time slot, in Kbps.

Figure 4:
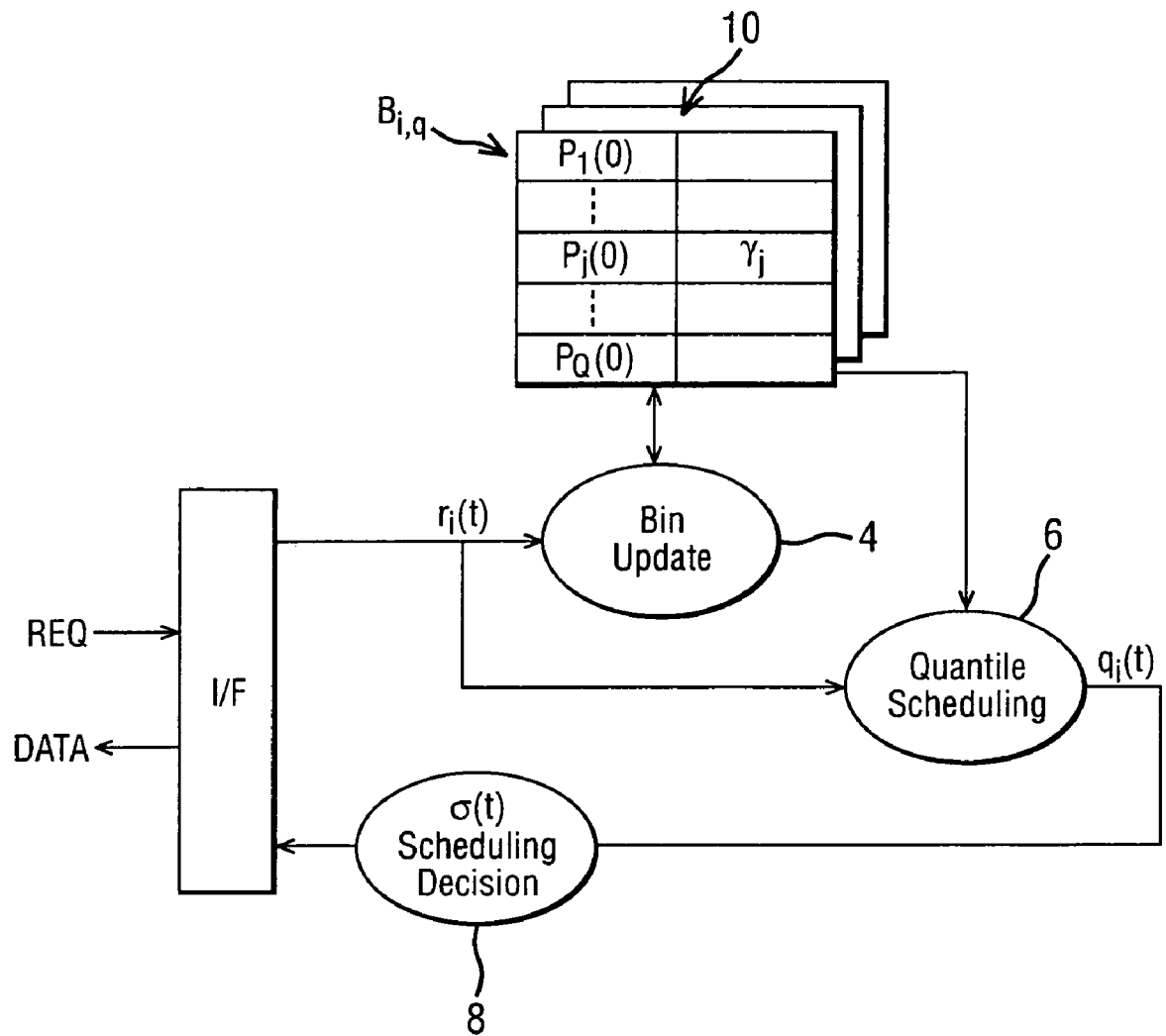
FIG. 4 is a schematic block diagram of functional blocks in a scheduler.

FIG. 4 is a schematic diagram of the functional blocks of the scheduler. As illustrated in FIG. 4, the scheduler 2 comprises an interface which receives incoming requests from users in the network and transmits data in time slots determined by the scheduler. The interface includes RF receive and transmit circuits, and channel control circuits which are known and not discussed further herein.

Incoming requests from the users define a data rate $r_i$ which as discussed earlier depends on the conditions of the radio link RL by means of which they are currently communicating with the base station BTS. The rate $r_i$, where i denotes a particular user is handled by a bin update algorithm 4 and a quantile scheduling algorithm 6 as will be discussed in more detail later. The bin update algorithm 4 and quantile scheduling algorithm 6 refer to state held in a store 10 which defines a set of rate bins $B_{i,q}$, each rate bin being defined by quantile boundaries $\rho_1(0) \ldots \rho_j(0) \ldots \rho_q(0)$ initially. Each rate bin is associated with a count $c_i j$. The bin update algorithm 4 sets the quantile indices (and hence the size and distribution) of the rate bins $B_{i,q}$. The quantile scheduling algorithm 6 assigns a value $q_i$ to each received rate $r_i$ and a scheduling decision 8 is implemented using the assigned value $q_i$. The rate bins constitute a reference framework that is invariant with respect to rate distribution of the channel. It will be appreciated that each user is associated with its own set of rate bins and counts at the scheduler 2.

For a more detailed explanation of the above principle consider a system with N nodes. As a first step, Q quantiles are defined for each node. A quantile set for node i is a partition of $R^+$ made of Q continuous rate sets (typically intervals) $B_{i,q}$, $q=1, \ldots, Q$ such that, for the distribution ③ of the rate $r_i$, $$③_i(B_{i,q}) = 1/Q \qquad \text{Equation 4}$$

Figure 5:
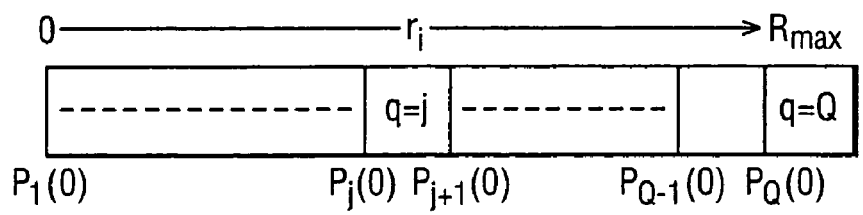
FIG. 5 is a schematic diagram illustrating rate bins.

The intervals $B_{i,q}$ are the rate bins for the distribution ③$_i$. FIG. 5 is a diagrammatic representation of the rate bins as a set of continuous rates, the rate increasing in the direction of the arrow. When node i requests rate $r_i(t)$ in the time slot t, we assign it a value $q_i(t)$ based on which quantile bin $r_i(t)$ falls into. The scheduling decision ⑨(t) is then:

$$⑨(t) = arg \max_{i?\{1,\ldots,N\}} q_i(t) \quad \text{Equation 5}$$

with a uniform random tie breaker. So, if the value of $r_i(t)$ falls into the top 100/Q % for the rate distribution of node i, we assign it the value Q. If it falls into the second 100/Q %, then we assign it the value Q−1, etc, until it falls into the lowest 100/Q % of the rate distribution of node i, where it is assigned the value $q_i(t)=1$.

The value of $q_i(t)$ need not to be a linear function of the quantile index. It is possible to construction other functions. The only property that is important is that it is increasing or quasi increasing (see later) with the quantile index.

Assuming the quantile bins are given as in Equation 4, the value $q_i(t)$ is a uniform random variable on $\{1, \ldots, Q\}$. Fairness is achieved as all the nodes compete for scheduling using a value $q_i$ that is homogenous from the point of view of the scheduler. The fact that the value of $q_i$ increase with the rate performance ensures the correct use of the channel.

We now describe how to compute the quantiles for the rate distribution ③ of $r_i$. The description is similar for each node, so we drop the subscript i in the next section whenever there is no confusion.

We assume that the rate distribution is bounded by a value $R_{max}$, as it simplifies the description of the algorithm. However, the results can be easily extended to the case $R_{max}=\blacksquare$. We first consider an easy case, namely when ③ does not have any singularity.

Case 1 (Particular Case)

Since ③ does not have any singularity, the pdf of $r_i$ is strictly increasing. For node i, we give ourselves a sequence ⑧$_j(0), j=0, \ldots, Q$ such that $$⑧_0(0)=0<⑧_1(0)<\ldots<⑧_{Q-1}(0)<⑧_Q(0)=R_{max} \quad \text{Equation 6}$$

Thus, the ⑧$_j(0)$ form a partition of $(0,R_{max})$. For every rate $r_i(t)$ that falls into $(⑧_j, ⑧_{j+1}]$, we assign value j to the rate $r_i(t)$ and increase the count ☞$_j$ by one. After t times intervals, we recompute the value of the ρ sequence by using the bin update algorithm 4:

Compute the values $V_j=\Sigma_{k=1}^{j}$ ☞$_k/T$, with $V_0 \triangleq 0$, and define the function v(x) to be the linear interpolation of the points ⑧$_j$, $V_j$ on $(0, R_{max})$.

(Note that more complicated interpolations are possible, but simulations show that linear seem to work well enough.)

Set ⑧$_j(T)=v^{-1}(j/Q)$ for $j=1, \ldots, Q-1$, where $v^{-1}(x) \triangleq \min_y\{v(y)=x\}$.

Reset the counters ☞$_j$ back to 0.

Note that the state to be maintained in the store 10 is composed of Q−1 values for the ⑧$_j$'s and Q counts ☞$_j$. The convergence speed of the bin update algorithm can be increased by keeping track of the previous points (⑧$_j(n-1)T)$, $V_j((n-1\_T))$ at the previous update time $(n-1)T$ so as to refine the interpolated function v(x) at time nT with 2Q linear segments instead of Q. This avoids the convergence "ping-ponging" around the limit.

Because ③ does not have any singularity, the pdf is a continuous increasing function on [0,1] and the ⑧$_j$'s converge to value $p_j^*$'s such that rate $r_i(t)$ falls into each bin $(⑧_j, ⑧_{j+1}]$ with equal probability. This also implies some increasing property on the quantile value $q_i$. $q_i$ is increasing (however not strictly) with increasing $r_i$.

Case 2 (General Case)

In general, the algorithm in the previous case will not necessarily converge to equiprobable bins if ③ has singularities. In the extreme case of a point mass for rate r, i.e. ③=☞$_r$, all the ⑧$_j$ will converge to r and only one counter ☞$_j$ accounts for the different rate requests.

Also, even if ③ has no singularity, the empirical bins constructed according to the bin update algorithm might be inaccurate, depending on the value of the update time T. The shorter T, the less accurate the constructed bins. To correct from the inaccuracy due to the empirical estimations or the singularities in the distribution, we use the quantile scheduling algorithm 6:

The values $V_j$ specify a partition of [0,1]. However this partition differs from the one created by the intervals [(j−1)/k,j/k). Define $U_j$ to be the interval $[V_{j-1}, V_j)$ for $j=1, \ldots, Q$. Similarly, define $I_j$ to be the interval $$\left[\frac{j-1}{Q}, \frac{j}{Q}\right) \text{ for } j = 1, \ldots, Q.$$

The length of a set S is defined as:

$$l(S)=\max(x?S)-\min(x?S) \quad \text{Equation 7}$$

and $l(\emptyset)=0$. Define the set of probabilities $\pi_k^j$ to be, for all $I_k$ with non-null length:

$$\pi_k^j = \frac{l(U_k \cap I_j)}{l(U_k)} \quad \text{Equation 8}$$

If $U_k$ has length zero, then it means that no rate fall in this interval, so there is no need to compute the value $\pi_k^j$. We can check that $\Sigma_j \pi_k^j=1$ for all j, as in the $U_k$ partition [0,1].

The rate $r_i(t)$ belongs to some set $B_k \triangleq [\rho_{k-1}, \rho_k)$. We define the value $q_i(t)$ to be equal to j with probability $\pi_k^j$. The quantile scheduling algorithm thus acts as follows:

At every sampling update nT, compute the value of the $\pi_k^j$ based on the values of $V_i$'s and ☞$_i$'s.

For each rate $r_i(t)$, find the interval $B_k$ it belongs to.

Generate a random variable $q_i$ equal to j with probability $\pi_k^j$, $q_i(t)=j$.

In the scheduling decision 8, select the node with the maximal $q_i$. Break the ties with an equiprobable coin toss.

So the algorithm is using the bin update algorithm as in the particular case for the computation of the values ⑧$_j$. For determining the value $q_i$, the computation of the probability $\pi_k^j$ is added. Note that if $I_k$ is close to $U_k$, then $\pi_k^k \phi 1$ and the general case is an extension of the particular case: whenever the rate $r_i(t)$ falls into the bin $(⑧_{k-1}, ⑧_k)$, it receives the value $q_i(t)=k$.

This scheduling algorithm produces for node i a random value $q_i$ that is uniformly distributed over $1, \ldots, Q$, and is tightly correlated to the performance of the channel: the value is quasi-increasing with the channel conditions. It is not strictly increasing: if $r<r'$ are such that they both belong to $(⑧_{j-1}, ⑧_j)$, then the value q could be higher than q'. However, if $r<r'$ fall in different bins, then $q<q'$.

The fact that the $\pi_k^j$ matrix is square is a result of the path we chose to describe it. The particular case implies a diagonal matrices where $\pi_k^k=1$ and $pi_k^j=0$ for j γ k. We could have considered S values for the $⑧_j$, j=1, ..., S with $⑧_0=0$. This would yield S interval $I_k$, and a S×Q matrix for the $pi_k^j$.

If $R_{max}=∞$, the algorithm can be adapted as follows. Choose $⑧_Q(0)$ arbitrarily, yet satisfying the inequality in Equation 6. At every update time nT, find k such that k=max{j:j/Q [v($⑧_Q$]}. If k=Q, then update as in the bin update algorithm. If k<Q, then update $⑧_1, ...,⑧_k$ as in the bin update algorithm. For j=k+1, ..., Q, set $⑧_j=α^{j-k}⑧_k$ with $α>1$. Note that it does not matter whether or not $⑧_Q$ eventually converges to ∞ as we are only interested in finding $⑧_{Q-1}$ such that $P(r_i>⑧_{Q-1})=1/Q$. Once we find a value $⑧_Q$ such that $v(⑧_Q)>(Q-1)/Q$, then we can converge to $⑧_{Q-1}$.

The quantile scheduler 6 can of course be used without the bin update algorithm. The bins $B_j$ can be preset once and for all as a partition of [0, ∞). The values $α_j$ and $V_j$ can then be replaced by exponential moving averages of the form:

$$V_j = α V_j + (1-α) 1_{\{r_i ∈ ∪_{j=1}^j B_i\}}$$

which converges to $P(r_i ? U_{i-1}^j B_j)$. The intervals $U_k$'s and probabilities $π_k^j$'s are derived identically as already described. However, since the sets $B_j$'s are not updated, the initial condition will strongly influence the eventual performance of the system.

The general case above can be transposed for slotted rates, which are fixed rates available for transmission between a mobile user and a base station in a wireless communications network. Assume now that the rate $r_i(t)$ can take only a finite number M of values. This is the case for most cellular systems. The scheduling algorithm can be applied here. Define the possible rates to be $R_1, ..., R_M$.

Define $⑧_0=0$ and then $⑧_j ?(R_j, R_{j-1})$. We can construct the probabilities $π_k^j$ as in the previous case, for k=1, ..., M and j=1, ..., Q. There is no need to update the value of $⑧_j$, as the description of the rate distribution ③ cannot be improved upon.

In the slotted case, if r and r' fall in the same bin, they share the same value $R_j$. Thus the value $q_i(t)$ is increasing in $r_i(t)$.

In practice, the value $⑧_j$ would not be computed. The count $α_j$ would be associated with the rate $R_j$ and the quantile scheduling algorithm would use the values of $α_j$'s to compute $V_j$'s, $B_j$'s and $π_k^j$'s.

We have shown how to construct a uniform random variable that is quasi-increasing with $r_i(t)$. However, the choice of a uniform distribution for the value of q was dictated by fairness among the nodes competing for the channel. It is possible to modulate the distribution in order to enforce some level of QoS.

For instance, a possible QoS policy would give uniform values for best effort nodes. Nodes that request a better level of service could receive a distribution slanted towards higher values. Instead of having Q quantiles of equal size, the nodes receiving preferred service would have quantiles such that the top ones are larger than the bottom one. There are many ways of doing so.

The above-described embodiment provides a novel scheduling algorithm that performs as well as a legacy algorithm when multiple users try to access a wireless resource and share the same channel characteristics in distribution. Furthermore, it has the added benefit with respect to legacy scheduling algorithms that it does not exhibit bias when the channel characteristics of the users are different, neither when the channel characteristics are correlated nor when some users are rate limited.

The system can be implemented within a CDMA HDR network and requires no changes to the standard architecture and moreover can utilise the same interface as existing scheduling algorithms.

It is noted that a factor in improving the performance of the above-described arrangement is selection of the number of quantiles. As the number of quantiles increases, the likelihood that more than one node request a rate in the same quantile decreases, and thus the effect of the algorithm is enhanced.

What is claimed is:

1. A method of scheduling data transmission between a plurality of nodes in a wireless communication network, the method comprising:
   defining a plurality of rate bins, each rate bin being defined by a quantile index;
   receiving transmission requests from said nodes, each of said requests defining a data rate;
   assigning a value to each request based on the data rate defined in the request and the quantile indices of the rate bins, wherein the value is assigned based on in which rate bin the data rate falls; and
   effecting a scheduling decision based on the value assigned to the request.

2. The method according to claim 1, wherein the node is a mobile user.

3. The method according to claim 1, wherein the node is an access point.

4. The method according to claim 1, comprising the step of transmitting data in successive time slots, wherein the scheduling decision selects which node to transmit data to in each time slot.

5. The method according to claim 1, wherein each rate bin has a size, all rate bins being of the same size.

6. The method according to claim 1, wherein each rate bin has a size, at least some of said rate bins having sizes different from other rate bins.

7. The method according to claim 1, wherein the assigned value is a linear function of the quantile index.

8. The method according to claim 1, wherein the assigned value is a non-linear function of the quantile index.

9. The method according to claim 1, which further comprises the step of transmitting data to one of said plurality of nodes selected in the scheduling decision over a channel for the selected node.

10. The method according to claim 9, wherein the channel is defined by a code for said node.

11. The method according to claim 10, wherein the channel is defined by a frequency for said node.

12. A method of scheduling data transmission between a plurality of nodes in a wireless communication network, the method comprising:
   defining a plurality of rate bins, each rate bin being defined by a quantile index;
   receiving transmission requests from said nodes, each of said requests defining a data rate;
   assigning a value to each request based on the data rate defined in the request and the quantile indices of the rate bins, wherein the value is assigned based on in which rate bin the data rate falls;
   effecting a scheduling decision based on the value assigned to the request; and
   transmitting data in successive time slots, wherein the scheduling decision selects which node to transmit data to in each time slot, wherein the scheduling decision ($\sigma(t)$) takes the form:

$$\sigma(t) = \arg\max_{i \in \{1,\ldots,N\}} q_i(t)$$

where ($\sigma(t)$) denotes a selected node for a time slot (t), ($q_i(t)$) denotes assigned values for the plurality of nodes in that time slot, (i) denotes a user and (N) denotes the number of nodes in the plurality of nodes.

13. A method of scheduling data transmission between a plurality of nodes in a wireless communication network, the method comprising:
  defining a plurality of rate bins, each rate bin being defined by a quantile index;
  receiving transmission requests from said nodes, each of said requests defining a data rate;
  assigning a value to each request based on the data rate defined in the request and the quantile indices of the rate bins, wherein the value is assigned based on in which rate bin the data rate falls; and
  effecting a scheduling decision based on the value assigned to the request,
  wherein the step of defining the plurality of rate bins comprises using a bin update algorithm which uses rates defined in requests received over a preceding period of time.

14. A method of scheduling data transmission between a plurality of nodes in a wireless communication network, the method comprising:
  defining a plurality of rate bins, each rate bin being defined by a quantile index;
  receiving transmission requests from said nodes, each of said requests defining a data rate;
  assigning a value to each request based on the data rate defined in the request and the quantile indices of the rate bins, wherein the value is assigned based on in which rate bin the data rate falls; and
  effecting a scheduling decision based on the value assigned to the request,
  wherein the step of assigning the value comprises ascertaining with an exact probability in which rate bin the rate falls.

15. A network entity adapted for scheduling data transmission between a plurality of nodes in a wireless communication network, the network entity comprising:
  means for defining a plurality of rate bins, each of said rate bins defined by a quantile index;
  means for receiving transmission requests from said nodes, each of said requests defining a data rate;
  means for assigning a value to each request based on the data rate defined in the request and the quantile indices of the rate bins wherein the value is assigned based on in which rate bin the data rate falls; and
  effecting a scheduling decision based on the value assigned to the request.

16. A network entity according to claim 15, comprising a store holding quantile indices and associated counts of data rates falling in said rate bins.

* * * * *